United States Patent
Hasegawa et al.

(10) Patent No.: US 12,209,454 B2
(45) Date of Patent: Jan. 28, 2025

(54) GLASS PANEL UNIT AND METHOD FOR MANUFACTURING THE GLASS PANEL UNIT

(71) Applicant: PANASONIC INTELLECTUAL PROPERTY MANAGEMENT CO., LTD., Osaka (JP)

(72) Inventors: Kenji Hasegawa, Osaka (JP); Eiichi Uriu, Osaka (JP); Kazuya Hasegawa, Osaka (JP); Tasuku Ishibashi, Ishikawa (JP); Hiroyuki Abe, Osaka (JP); Masataka Nonaka, Osaka (JP); Takeshi Shimizu, Osaka (JP); Haruhiko Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 779 days.

(21) Appl. No.: 17/287,890

(22) PCT Filed: Sep. 25, 2019

(86) PCT No.: PCT/JP2019/037693
§ 371 (c)(1),
(2) Date: Apr. 22, 2021

(87) PCT Pub. No.: WO2020/095560
PCT Pub. Date: May 14, 2020

(65) Prior Publication Data
US 2021/0396072 A1    Dec. 23, 2021

(30) Foreign Application Priority Data
Nov. 5, 2018   (JP) .................................. 2018-208478

(51) Int. Cl.
*B60J 1/10*        (2006.01)
*B32B 3/26*        (2006.01)
(Continued)

(52) U.S. Cl.
CPC ............ *E06B 3/6775* (2013.01); *B32B 3/266* (2013.01); *B32B 17/10036* (2013.01);
(Continued)

(58) Field of Classification Search
CPC ......... Y02B 80/22; Y02A 30/249; E06B 3/66; E06B 3/6608; E06B 3/6612;
(Continued)

(56) References Cited

U.S. PATENT DOCUMENTS 5,027,567 A *  7/1991  Roberts ............. B32B 17/10761
                                                    52/204.593
5,120,584 A     6/1992  Ohlenforst et al.
(Continued)

FOREIGN PATENT DOCUMENTS

CA    2 258 314 A1    7/1999
DE    3517581 A1      9/1986
(Continued)

OTHER PUBLICATIONS

Machine translation of DE 102004/044907 A1.*
(Continued)

*Primary Examiner* — Z. Jim Yang
(74) *Attorney, Agent, or Firm* — Rimon P.C.

(57) ABSTRACT

A glass panel unit includes: a first substrate including a first glass panel; a second substrate including a second glass panel; and a frame-shaped sealing portion that is hermetically bonded to the first substrate and the second substrate. The sealing portion creates an evacuated space between the first substrate and the second substrate. When viewed from a region where the second substrate is positioned with (Continued)

respect to the first substrate, the first substrate includes a part arranged to stick out of an edge of the second substrate. The part includes a mounting portion used to mount the glass panel unit onto a vehicle.

10 Claims, 8 Drawing Sheets

(51) Int. Cl.
*B32B 17/10* (2006.01)
*B60J 1/00* (2006.01)
*E06B 3/66* (2006.01)
*E06B 3/677* (2006.01)

(52) U.S. Cl.
CPC .............. *B60J 1/008* (2013.01); *B60J 1/10* (2013.01); *E06B 3/6612* (2013.01)

(58) Field of Classification Search
CPC .... E06B 3/6617; E06B 3/663; E06B 3/66304; E06B 3/67; E06B 3/6715; E06B 3/54; E06B 3/5436; B60J 1/001; B60J 1/004–006; B60J 1/10; B60J 1/008; B32B 17/10–1099
See application file for complete search history.

(56) References Cited

U.S. PATENT DOCUMENTS

| | | | |
|---|---|---|---|
| 5,992,099 A | 11/1999 | Thomas | |
| 6,749,926 B1* | 6/2004 | Yoshizawa | C03B 23/03 65/102 |
| 2004/0035086 A1* | 2/2004 | Minaai | E06B 3/6617 52/786.13 |
| 2009/0324858 A1* | 12/2009 | Jaeger | E06B 3/6612 156/107 |
| 2015/0224855 A1* | 8/2015 | Legrand | B60J 1/008 52/204.62 |
| 2015/0299025 A1 | 10/2015 | Brown et al. | |
| 2015/0345208 A1 | 12/2015 | Boulanger et al. | |
| 2019/0224948 A1 | 7/2019 | Frebourg | |
| 2019/0270215 A1 | 9/2019 | Shimizu et al. | |
| 2019/0322161 A1* | 10/2019 | Uebelacker | B32B 3/266 |
| 2020/0238663 A1* | 7/2020 | Wessberg | B32B 17/10761 |
| 2020/0361110 A1 | 11/2020 | Shimizu et al. | |
| 2021/0100074 A1* | 4/2021 | Losot | B32B 17/10091 |
| 2021/0323278 A1* | 10/2021 | Benedetto | B32B 17/10036 |
| 2021/0388667 A1* | 12/2021 | Sato | E06B 3/67 |

FOREIGN PATENT DOCUMENTS

| | | | | |
|---|---|---|---|---|
| DE | 295 03 036 U1 | | 4/1995 | |
| DE | 102004044907 A1 | * | 2/2006 | .......... E06B 3/5427 |
| DE | 202017006786 U1 | * | 6/2018 | |
| EP | 0 307 280 A2 | | 3/1989 | |
| GB | 2 178 471 A | | 2/1987 | |
| JP | H10-297944 A | | 11/1998 | |
| JP | 2002-255593 A | | 9/2002 | |
| JP | 2005-029083 A | | 2/2005 | |
| JP | 2016-503750 A | | 2/2016 | |
| JP | 2016-508944 A | | 3/2016 | |
| NL | 8303158 A | * | 4/1985 | .......... E06B 3/5436 |
| WO | 2018/011278 A1 | | 1/2018 | |
| WO | 2018/088539 A1 | | 5/2018 | |
| WO | WO-2018221208 A1 | * | 12/2018 | ............ C03C 27/06 |

OTHER PUBLICATIONS

Machine translation of DE 202020/1706786 U1.*
Machine translation of NL 83/03158 A.*
Extended European Search Report issued in European Patent Application No. 19882299.1, dated Nov. 3, 2021.
International Search Report and Written Opinion issued in International Patent Application No. PCT/JP2019/037693, dated Nov. 12, 2019; with partial English translation.

* cited by examiner

GLASS PANEL UNIT AND METHOD FOR MANUFACTURING THE GLASS PANEL UNIT

CROSS-REFERENCE OF RELATED APPLICATIONS

This application is the U.S. National Phase under 35 U.S.C. § 371 of International Patent Application No. PCT/JP2019/037693, filed on Sep. 25, 2019, which in turn claims the benefit of Japanese Application No. 2018-208478, filed on Nov. 5, 2018, the entire disclosures of which Applications are incorporated by reference herein.

TECHNICAL FIELD

The present disclosure generally relates to a glass panel unit and a method for manufacturing the same, and more particularly relates to a glass panel unit provided for a vehicle such as an automobile, and a method for manufacturing the same.

BACKGROUND ART

A glass panel unit provided for a vehicle such as an automobile is disclosed in Patent Literature 1. In the glass panel unit, an interlayer with thermal insulation properties is sandwiched between a pair of glass panes.

The glass panel unit provided for a vehicle is required to have excellent thermal insulation properties and be easily mounted onto a vehicle.

CITATION LIST

Patent Literature

Patent Literature 1: JP 2005-29083 A

SUMMARY OF INVENTION

It is therefore an object of the present disclosure to provide a glass panel unit which may have excellent thermal insulation properties and may be easily mounted onto a vehicle.

A glass panel unit according to an aspect of the present disclosure includes: a first substrate including a first glass panel; a second substrate including a second glass panel and arranged to face the first substrate; and a frame-shaped sealing portion that is hermetically bonded to the first substrate and the second substrate so as to create an evacuated space between the first substrate and the second substrate. When viewed from a region where the second substrate is positioned with respect to the first substrate, the first substrate includes a part arranged to stick out of an edge of the second substrate, the part includes a mounting portion used to mount the glass panel unit onto a vehicle.

A method for manufacturing a glass panel unit according to another aspect of the present disclosure is a method for manufacturing the glass panel unit. The first substrate and the second substrate curve alongside of each other. The method includes the step of having both of the first glass panel and the second glass panel curved together in a state where the first and the second glass panels are laid one on top of the other.

DESCRIPTION OF EMBODIMENTS

Exemplary Embodiment

FIGS. 1-4 show a glass panel unit 8 according to an exemplary embodiment. Constituent members of the glass panel unit 8 are schematically illustrated on the drawings. The dimensions and shapes of the constituent members illustrated are different from their actual dimensions and shapes.

Figure 5:
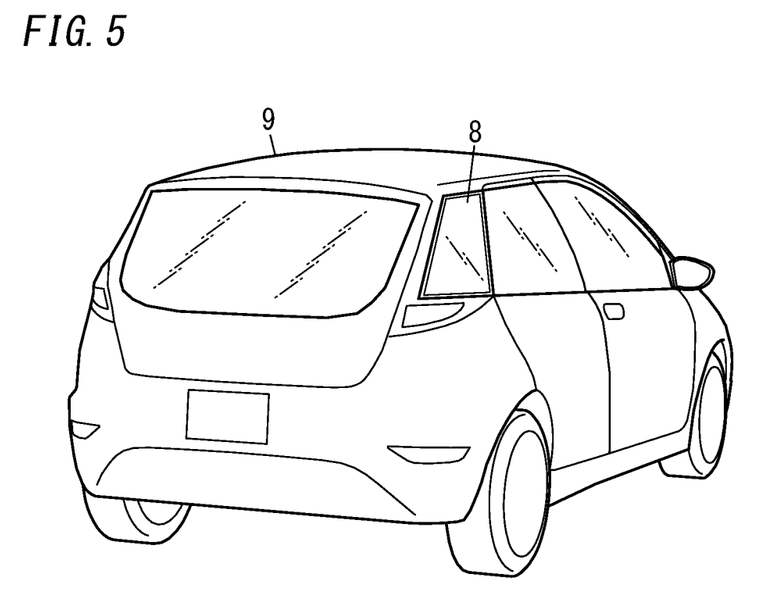
FIG. 5 is a perspective view of a vehicle having the glass panel unit mounted thereto.

As an example, the glass panel unit 8 of the present embodiment may be fitted into a window of a vehicle 9 as shown in FIG. 5. In the present embodiment, the vehicle 9 is an automobile, and the window in which the glass panel unit 8 is fitted is a side window of the automobile. The vehicle 9 may be configured to allow someone to travel and/or something to be carried. The vehicle 9 is not limited to an automobile, but may also be a railroad car, a watercraft, an aircraft, or any other type of vehicle.

The glass panel unit 8 of the present embodiment includes a first substrate 1, a second substrate 2, a sealing portion 4, and a plurality of pillars 6.

The first substrate 1 and the second substrate 2 are arranged to face each other with a small gap distance left between themselves. The first substrate 1 and the second substrate 2 are parallel to each other. The sealing portion 4 and the plurality of pillars 6 are provided between the first substrate 1 and the second substrate 2. As used herein, if something is parallel to something else, these two things do not have to be literally parallel to each other in a strict sense of the word.

The first substrate 1 will be described.

The first substrate 1 includes a first glass panel 15 having a light-transmitting property. In the present embodiment, the first substrate 1 is configured as the first glass panel 15 but may include the first glass panel 15 and an appropriate film covering at least a part of the first glass panel 15. The first glass panel 15 is a thin-plate-shaped glass panel which is gently curved as a whole and which has a trapezoidal external form in a plan view. The thickness t1 of the first glass panel 15 (see FIG. 4), is for example, 3 mm.

The first glass panel 15 is made of chemically tempered glass. However, this is not the only type of constituent glass material for the first glass panel 15. Alternatively, the first glass panel 15 may also be made of any other suitable type of glass material such as thermally tempered glass, high strain point glass, soda lime glass, alkali-free glass, or quartz glass.

In the glass panel unit 8 of the present embodiment, the first substrate 1 is the first glass panel 15 itself. The first substrate 1 is a thin-plate-shaped glass panel which is gently curved and has a trapezoidal external form in a plan view. The thickness of the first substrate 1 is the thickness t1 of the first glass panel 15.

The second substrate 2 will be described.

The second substrate 2 includes a second glass panel 25 having a light-transmitting property and a low emissivity film 27 almost entirely covering one surface of the second glass panel 25. In the present embodiment, the second substrate 2 is made up as the second glass panel 25 and the low emissivity film 27. Alternatively, the second substrate 2 may include either only the second glass panel 25 or the second glass panel 25 and another film covering at least a part of the second glass panel 25.

The second glass panel 25 is a thin-plate-shaped glass panel which is gently curved as a whole. The outer dimensions of the second glass panel 25 in a plan view are one step smaller than the outer dimensions of the first glass panel 15. The thickness t2 of the second glass panel 25 (see FIG. 4) is smaller than the thickness t1 of the first glass panel 15. The thickness t2 of the second glass panel 25 is, for example, 2 mm.

The external form of the second glass panel 25, in a plan view, is a trapezoidal one overlapping with the external form of a principal part 1a of the first substrate 1.

The principal part 1a of the first substrate 1 is a part, facing the second substrate 2, of the first substrate 1. In other words, the principal part 1a of the first substrate 1 is a part forming a hermetically sealed space S1 between the second substrate 2 and the first substrate 1 itself. The first substrate 1 may be divided into the principal part 1a and the other part 1b. The principal part 1a and the other part 1b will be described later again.

In the glass panel unit 8 of the present embodiment, the external form of the second substrate 2 in a plan view is the external form of the second glass panel 25. The second substrate 2 is a thin-plate-shaped glass panel which is gently curved and has a trapezoidal external form in a plan view.

The second glass panel 25, as well as the first glass panel 15, is made of chemically tempered glass. However, this is not the only type of constituent glass material for the second glass panel 25. Alternatively, the second glass panel 25 may also be made of any other suitable type of glass material such as thermally tempered glass, high strain point glass, soda lime glass, alkali-free glass, or quartz glass. Optionally, the first glass panel 15 and second glass panel 25 may be made of two different types of glass materials.

The low emissivity film 27 is formed on one surface, facing the first substrate 1 (more specifically, the principal part 1a of the first substrate 1), of the second glass panel 25. The low emissivity film 27 is a film containing a metal with low emissivity such as silver and has the capability of reducing the transfer of heat due to heat radiation.

Next, the sealing portion 4 will be described.

The sealing portion 4 is formed in a frame shape using a glass frit of low melting glass. The sealing portion 4 is provided between the first substrate 1 and the second substrate 2. The sealing portion 4 is hermetically bonded, along its entire circumference, to the facing surfaces of the first substrate 1 and the second substrate 2.

The part, facing the second substrate 2, of the first substrate 1 is configured as the surface of the first glass panel 15. The surface, facing the first substrate 1, of the second substrate 2 is configured as the surface of the low emissivity film 27.

The sealing portion 4 is hermetically bonded to the peripheral edge portion of the principal part 1a of the first substrate 1 and the peripheral edge portion of the second substrate 2. The external form of the sealing portion 4 has a trapezoidal shape.

The space S1 surrounded by the sealing portion 4 is formed between the principal part 1a of the first substrate 1 and the second substrate 2. An exhaust port 17 provided through the principal part 1a of the first substrate 1 is hermetically sealed with a sealing material 41. The space S1 is a hermetically sealed space surrounded by the principal part 1a of the first substrate 1, the second substrate 2, and the sealing portion 4. The space S1, for example, is evacuated to a degree of vacuum of 0.1 Pa or less, but only needs to be evacuated to at least a pressure lower than the atmospheric pressure.

The exhaust port 17 is a through hole used, in the process of manufacturing a glass panel unit 8 of the present embodiment (in detail, the evacuation step to be described later), for performing an evacuation operation of the space S1.

Next, the plurality of pillars 6 will be described.

The plurality of pillars 6 are placed to keep distance from each other in a plan view. The plurality of pillars 6 are respectively placed in a state which the pillars 6 are in contact with the facing surfaces of the first substrate 1 and the second substrate 2.

The plurality of pillars 6 are placed to be surrounded by the frame-shaped sealing portion 4. The plurality of pillars 6 are provided within the evacuated space S1. The plurality of pillars 6 function as spacers for keeping a predetermined gap distance between the first substrate 1 and the second substrate 2. Each of the plurality of pillars 6 is made entirely or partly of a metal-based material.

Furthermore, a getter is preferably further provided within the space S1 although it is not shown in any of the drawings. The getter is preferably provided on one or both of the facing surfaces of the first substrate 1 and the second substrate 2.

Next, the other part 1b of the first substrate 1 will be described.

The part 1b of the first substrate 1 may be regarded as a part outwardly extended from one side (in detail, the bottom side) of the principal part 1a with a trapezoidal form. The part 1b will be hereinafter referred to as an "extended part 1b".

The principal part 1a and the extended part 1b form a sheet of the first glass panel 15. In other words, the first glass panel 15 includes a part corresponding with the principal part 1a and a part corresponding with the extended part 1b. The other part, excluding the part corresponding with the principal part 1a, of the first glass panel 15 is the part corresponding with the extended part 1b.

Figure 1:
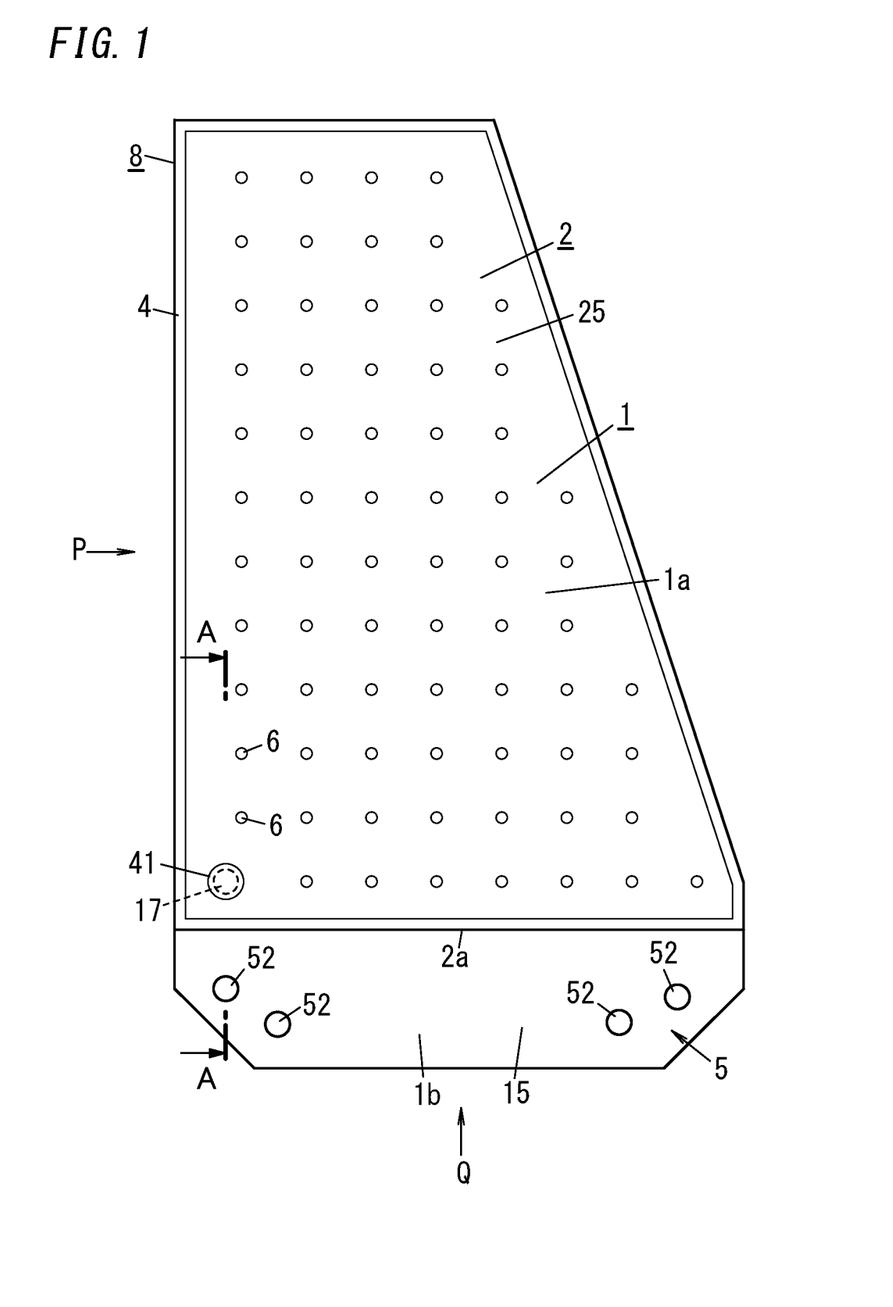
FIG. 1 is a plan view of a glass panel unit according to an exemplary embodiment.

As shown in FIG. 1, when viewed from a region where the second substrate 2 is positioned with respect to the first substrate 1, the principal part 1a of the first substrate 1 is arranged to overlap with the second substrate 2, and the extended part 1b of the first substrate 1 is arranged to stick out of an edge 2a of the second substrate 2. In other words, when viewed from a region where the second substrate 2 is positioned with respect to the first substrate 1, the part, arranged to overlap with the second substrate 2, of the first substrate 1 is the principal part 1a and the part, arranged to stick out of the edge 2a of the second substrate 2, of the first substrate 1 is the extended part 1b. The extended part 1b preferably has a form with chamfered corners shown in FIG. 1.

As previously stated, the first substrate 1 is a gently curved panel, and at least the principal part 1a gently curves alongside of the second substrate 2. The extended part 1b may be either curved as gently as the principal part 1a or be formed as a flat part. If the extended part 1b gently curves, the first substrate 1 continuously and gently curves from the principal part 1a through the extended part 1b. Curvatures of the principal part 1a and the extended part 1b may be the same or different from each other.

A plurality of mounting holes 52 are provided through the extended part 1b. The plurality of mounting holes 52 are through hole for use to mount the glass panel unit 8 on a vehicle 9.

In the glass panel unit 8 of the present embodiment, the plurality of mounting holes 52 form a mounting portion 5 for mounting the glass panel unit 8 on the vehicle 9. The mounting portion 5 is provided for the first substrate 1 and not provided for the second substrate 2. For example, the extended part 1b, and eventually, the whole glass panel unit 8, may be firmly mounted on the vehicle 9 by having a mounting member such as a bolt inserted into each of the plurality of mounting holes 52.

In the glass panel unit 8 of the present embodiment, the plurality of mounting holes 52 included in the mounting portion 5 are four circular holes that penetrate through the extended part 1b of the first substrate 1 in the thickness direction. However, the numbers, arrangement, and shape of the mounting holes 52 are not particularly limited. The mounting portion 5 only needs to include at least one mounting hole 52. Nevertheless, the mounting portion 5 preferably includes a plurality of mounting holes 52, and more preferably includes four or more mounting holes 52.

In the glass panel unit 8 of the present embodiment, the first substrate 1 and the second substrate 2 curve alongside of each other. Therefore, when the glass panel unit 8 is mounted on a vehicle 9 such as an automobile, the curve of the glass panel unit 8 may be brought into conformity with the curve of the body of the vehicle 9. Each of the first substrate 1 and the second substrate 2 only needs to be at least partially curved.

The glass panel unit 8 does not have to be curved but may be formed as a flat panel. In that case, the first substrate 1 and the second substrate 2 are both flat.

Figure 2:
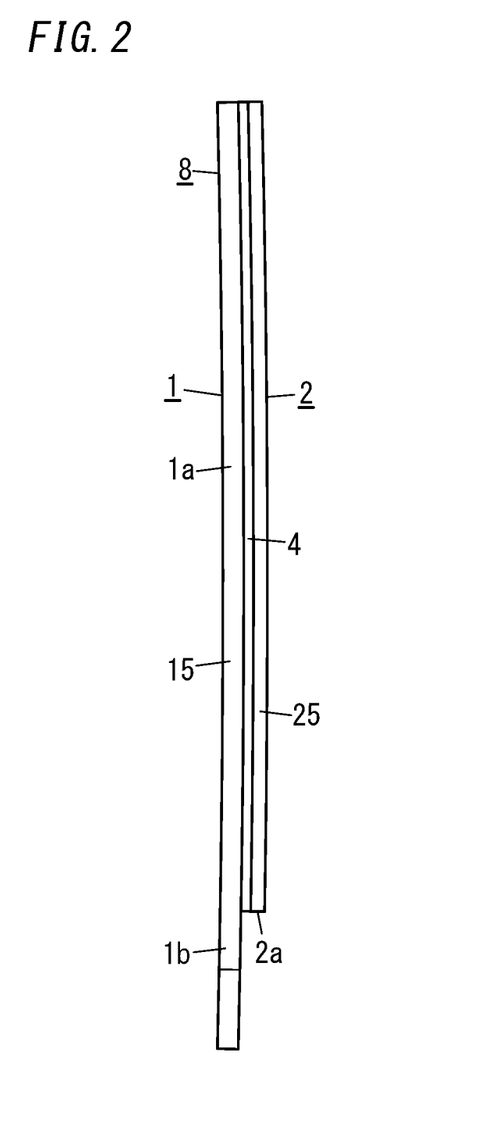
FIG. 2 is a side view as viewed in a direction indicated by the arrow P in FIG. 1.
Figure 3:
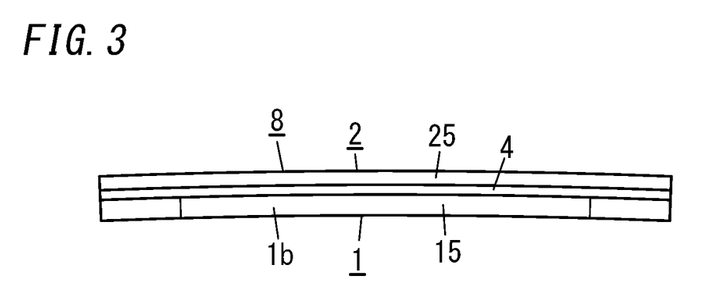
FIG. 3 is a side view as viewed in a direction indicated by the arrow Q in FIG. 1.
Figure 4:
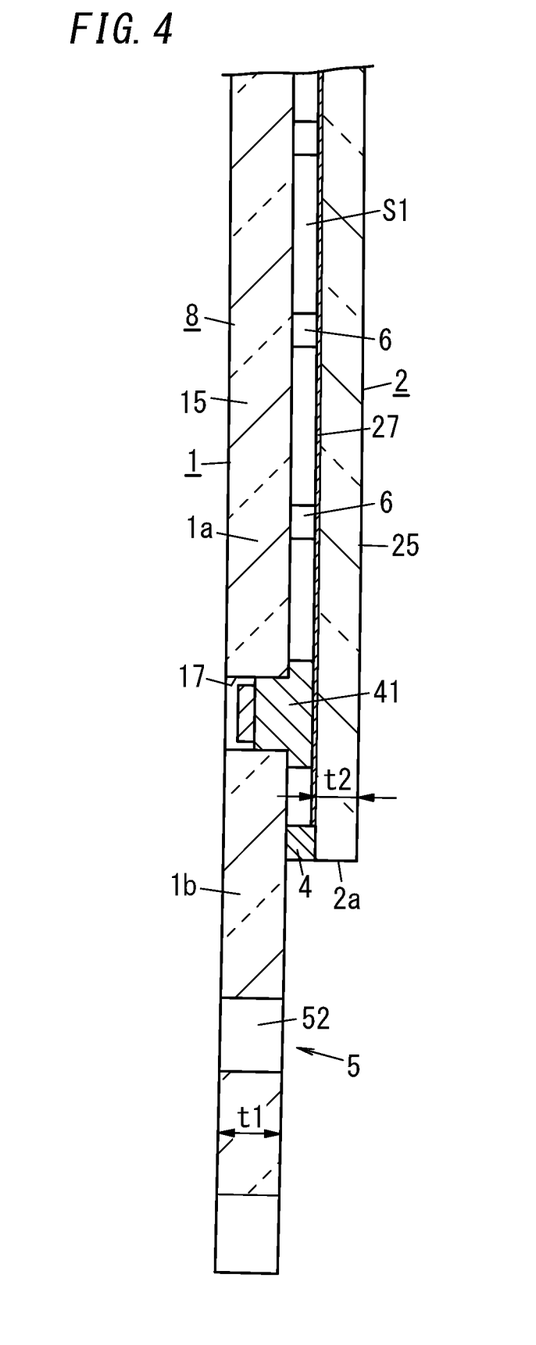
FIG. 4 is a cross-sectional view taken along the plane A-A in FIG. 1.

Furthermore, in the glass panel unit 8 of the present embodiment, the first substrate 1 and the second substrate 2 are curved in two directions perpendicular to each other (see FIGS. 2, 3). However, this is only an example of the curved form of the first substrate 1 and the second substrate 2 and should not be construed as limiting. For example, the first substrate 1 and the second substrate 2 may curve in only one direction out of the two directions perpendicular to each other.

Here, the two directions perpendicular to each other refer to a longitudinal direction and a latitudinal direction of the glass panel unit 8. The longitudinal directions of the glass panel unit 8, the first substrate 1, and the second substrate 2 agree with one another. Similarly, the latitudinal directions of the glass panel unit 8, the first substrate 1, and the second substrate 2 also agree with one another.

In the first substrate 1, the principal part 1a and the extended part 1b are continuous with each other in the longitudinal direction of the first substrate 1. Of the first substrate 1, one end part in the longitudinal direction is the extended part 1b and the remaining part is the principal part 1a.

The curvatures in the longitudinal direction and the latitudinal direction of the first substrate 1 may be the same or different from each other. As an example, the curvature in the longitudinal direction of the first substrate 1 is larger than the curvature in the latitudinal direction of the first substrate 1. As in the first substrate 1, the curvature in the longitudinal direction of the second substrate 2 is larger than the curvature in the latitudinal direction of the second substrate 2. The curvature in the longitudinal direction of the glass panel unit 8 is larger than the curvature in the latitudinal direction of the glass panel unit 8.

Alternatively, the curvature in the latitudinal direction of the glass panel unit 8 may be made larger than the curvature in the longitudinal direction of the glass panel unit 8. In this case, the curvature in the latitudinal direction of the first substrate 1 is larger than the curvature in the longitudinal direction of the first substrate 1, and the curvature in the latitudinal direction of the second substrate 2 is larger than the curvature in the longitudinal direction of the second substrate 2.

Next, a manufacturing method of the glass panel unit 8 of the present embodiment (hereinafter simply referred to as a "manufacturing method of the present embodiment") will be described.

The manufacturing method of the present embodiment includes: a preparatory step; a pillar placement step; a bonding step; an evacuation step; and a sealing step.

In the preparatory step, a first glass panel 15 and a second glass panel 25 are prepared. The first glass panel 15 is a glass panel which has a plurality of mounting holes 52 provided for a part corresponding with the extended part 1b, and an exhaust port 17 provided for a part corresponding with the principal part 1a, in a glass pane cut out from mother glass into a predetermined shape. The second glass panel 25 is a glass pane cut out from mother glass into a predetermined shape. The exhaust port 17 is provided through the first glass panel 15 and not provided through the second glass panel 25.

In the preparatory step, the first glass panel 15 and the second glass panel 25 are laid one on top of the other and heated in this state to make both the first glass panel 15 and the second glass panel 25 curved together. As a result, the first glass panel 15 and the second glass panel 25 are caused to curve alongside of each other. The second glass panel 25 is preferably laid on top of the part corresponding with the principal part 1a of the first glass panel 15. This step is unnecessary if the glass panel unit 8 does not have to be curved.

Furthermore, a low emissivity film 27 is bonded to the second glass panel 25. This step is unnecessary if the second substrate 2 does not include the low emissivity film 27. Alternatively, the low emissivity film 27 may be bonded to the other, first glass panel 15. A film having a different function from the low emissivity film may be bonded to at least one of the first glass panel 15 or the second glass panel 25.

In the pillar placement step, a plurality of pillars 6 are placed to keep distance from each other on one surface (in detail, the upper surface) of the first substrate 1.

If the glass panel unit 8 of the present embodiment includes a getter, the manufacturing method of the present embodiment further includes a getter arrangement step. In the getter arrangement step, the getter is provided on one or both of the facing surfaces of the first substrate 1 and the second substrate 2. The getter arrangement step may be performed before, after, or in parallel with, the pillar placement step.

The getter arranged in the getter arrangement step may be in a paste form or a solid form. When the getter in the paste form is used, the getter in the paste form is preferably applied, using an appropriate application device such as a dispenser, on one or both of the facing surfaces of the first substrate 1 and the second substrate 2. When the getter in the solid form is used, the getter in solid form is preferably arranged on a recess provided on one or both of the facing surfaces of the first substrate 1 and the second substrate 2.

In the bonding step, a frame-shaped sealing portion 4 is formed between the first substrate 1 and the second substrate 2, and the first substrate 1 and the second substrate 2 are bonded with the sealing portion 4. In detail, first, a glass frit of low-melting glass which is a material for the sealing portion 4 is placed in a frame shape along a peripheral edge portion of the principal part 1a of the first substrate 1. Next, the entire assembly is heated in a state where the glass frit thus placed and the plurality of pillars 6 are sandwiched between the first substrate 1 and the second substrate 2. The frame-shaped sealing portion 4 is formed by having the glass frit sandwiched between the first substrate 1 and the second substrate 2 solidified after having been once melted.

In the evacuation step, a space S1 is evacuated to a predetermined degree of vacuum by having the air within the space S1 exhausted through the exhaust port 17. The space S1 is evacuated by going through the evacuation step.

The sealing step is a step in which the space S1 is hermetically sealed while being maintained in the evacuated state. In the sealing step, with the space S1 kept evacuated, the exhaust port 17 is sealed up with a sealing material 41. The sealing material 41 is formed, for example, of the glass frit. The sealing material 41, for example, is once melted by being irradiated and locally heated with an infrared ray radiated externally, and then solidified to seal up the exhaust port 17. As a result, the space S1 is hermetically sealed in the evacuated state. The method described above is only an exemplary method for hermetically sealing the space S1, and the space S1 may be sealed by any other method.

The glass panel unit 8 of the present embodiment manufactured through the above steps includes a hermetically sealed space S1 in an evacuated state between the first substrate 1 and the second substrate 2. Therefore, the glass panel unit 8 of the present embodiment may have excellent thermal insulation properties. Moreover, in the glass panel unit 8 of the present embodiment, the extended part 1b of the first substrate 1 has four mounting holes 52 for mounting the extended part 1b onto a vehicle 9. Therefore, by using the four mounting holes 52, the glass panel unit 8 of the present embodiment may be mounted onto the vehicle 9 easily and with high reliability.

Variation

Figure 6:
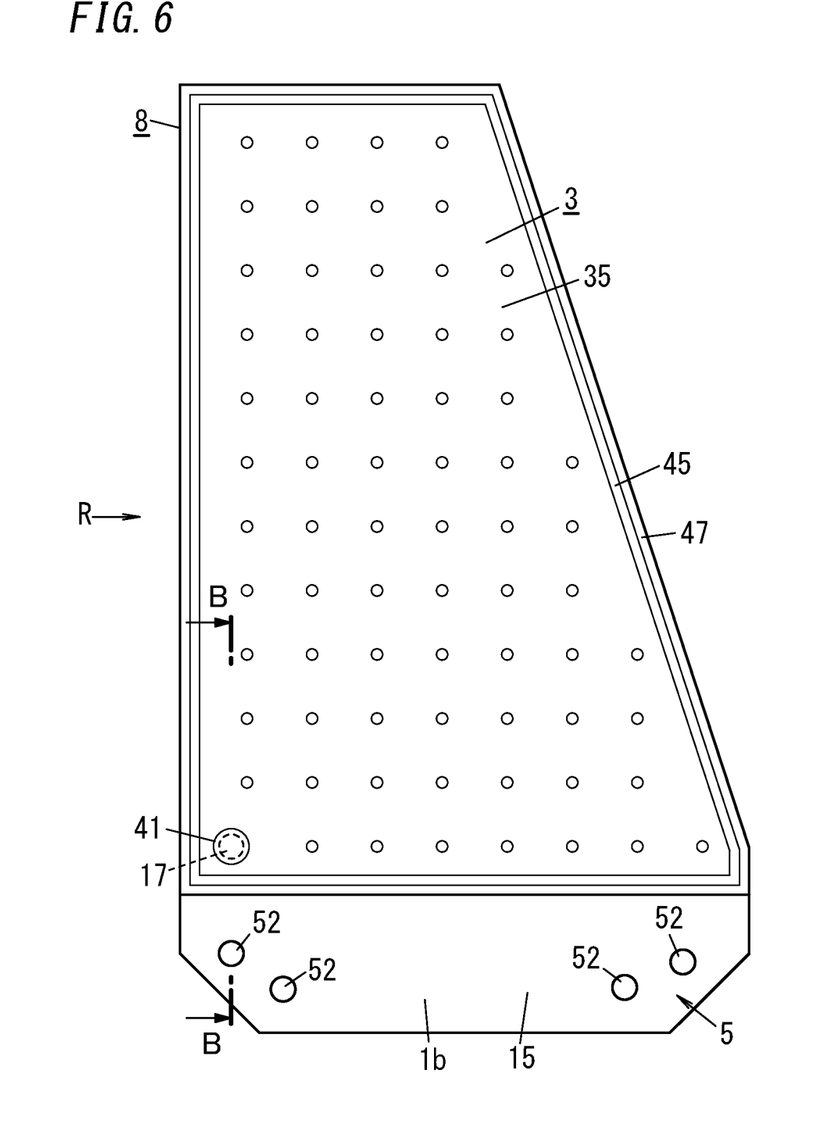
FIG. 6 is a plan view illustrating a variation of the glass panel unit.
Figure 7:
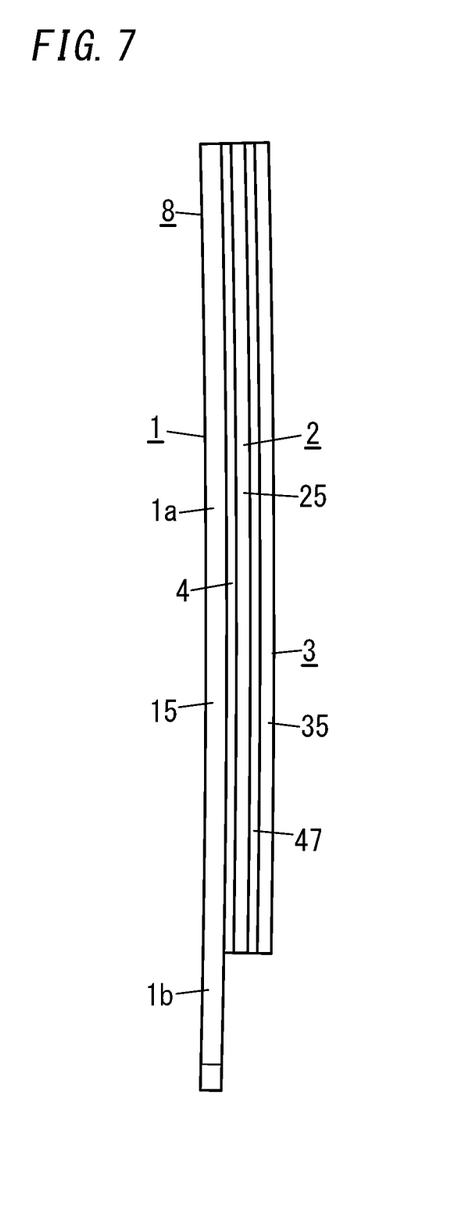
FIG. 7 is a side view as viewed in a direction indicated by the arrow R in FIG. 6.
Figure 8:
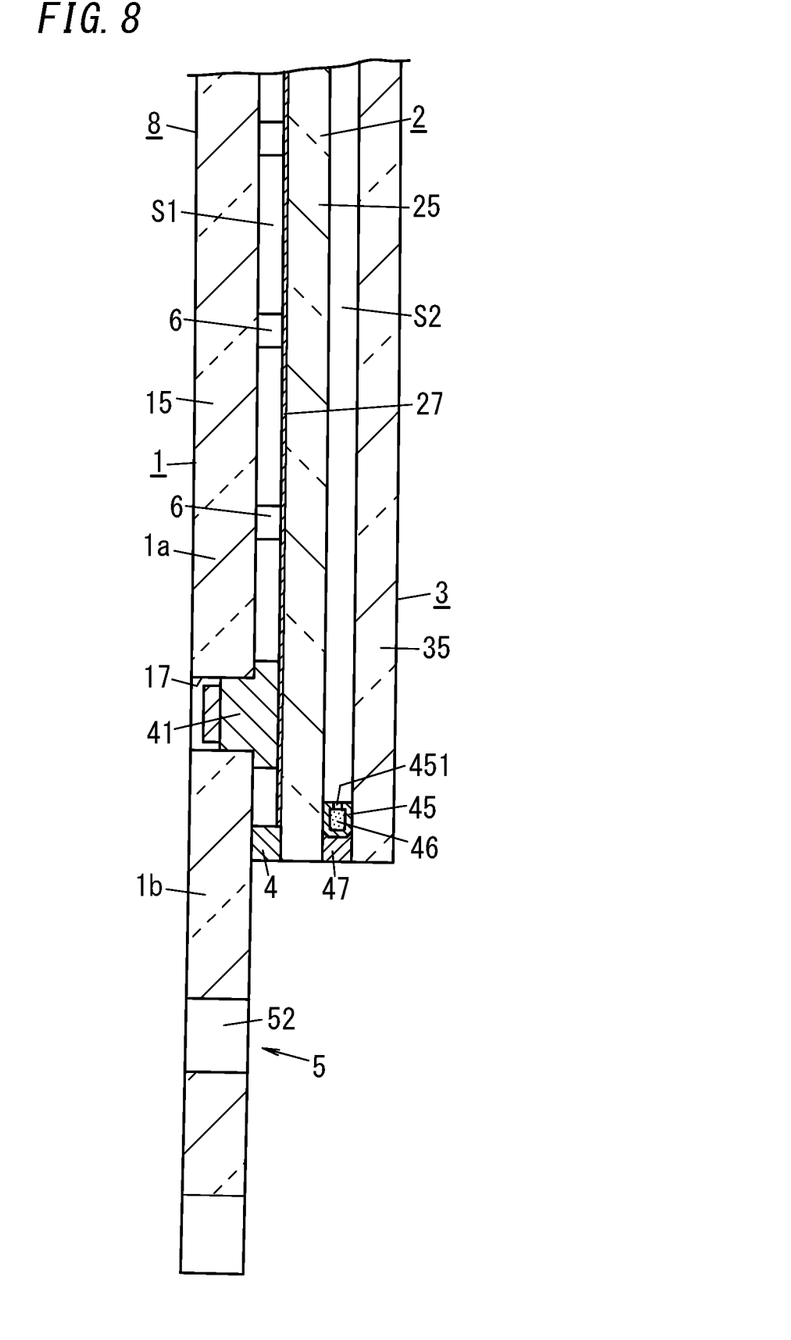
FIG. 8 is a cross-sectional view taken along the B-B in FIG. 6.

Next, a variation of the glass panel unit 8 will be described with reference to FIGS. 6-8. In the following description, any constituent element of this variation of the glass panel unit 8, having the same function as a counterpart of the embodiment described above, will be designated by the same reference numeral as that counterpart's, and a detailed description thereof will be omitted herein.

The variation of the glass panel unit 8 includes a third substrate 3 in addition to the first substrate 1 and the second substrate 2. The third substrate 3 includes at least a third glass panel 35. In the variation, the third substrate 3 is configured as the third glass panel 35, but an appropriate coating may be applied to the third glass panel 35.

In this variation, the third substrate 3 overlaps with, and faces, the second substrate 2. This allows creating a hermetically sealed space S2 between the second substrate 2 and the third substrate 3. This space S2 will be hereinafter referred to as a "second space S2".

The arrangement of the third substrate 3 is not limited to this. Alternatively, the third substrate 3 may overlap with, and faces, the first substrate 1 to create the second hermetically sealed space S2 between the first substrate 1 and the third substrate 3.

A frame-shaped spacer 45 with a hollow portion and a frame-shaped second sealing portion 47 formed to cover the outer periphery of the spacer 45 are interposed between respective peripheral edge portions of the third substrate 3 and the second substrate 2. The hollow portion of the spacer 45 is filled with a desiccant 46. The second space S2 is a hermetically sealed space surrounded by the third substrate 3, the second substrate 2, and the second sealing portion 47.

The spacer 45 has an exhaust port 451 which allows its own hollow portion to communicate with the outside. The desiccant 46 is, for example, a silica gel. The second sealing portion 47 is made of highly airtight resin and is hermetically bonded to the third substrate 3 and the second substrate 2. The second space S2 is filled with a dry gas (for example, dried rare gas such as argon, or dry air).

In the variation, the third substrate 3 is a thin-plate-shaped panel which is gently curved. The third substrate 3 curves alongside of the second substrate 2 and the first substrate 1. As in the first and second substrates 1, 2, the curvatures in the longitudinal direction and the latitudinal direction of the third substrate 3 may be the same or different from each other. The curvature in the longitudinal direction of the third substrate 3 may be larger than the curvature in the latitudinal direction of the third substrate 3. Moreover, the curvature in the latitudinal direction of the third substrate 3 may be larger than the curvature in the longitudinal direction of the third substrate 3.

In this variation, when the glass panel unit 8 is mounted on a vehicle 9 such as an automobile, the curve of the glass panel unit 8 may be brought into conformity with the curve of the body of the vehicle 9. Each of the first substrate 1, the second substrate 2, and the third substrate 3 only needs to be at least partially curved.

A manufacturing method according to this variation of the glass panel unit 8, includes a second bonding step in addition to the respective steps described above. The second bonding step is the step of hermetically bonding the second substrate 2 and the third substrate 3 (or the first substrate 1 and the third substrate 3) with the second sealing portion 47, in a state where the spacer 45 is sandwiched between the second and the third substrates 2, 3 (or the first substrate 1 and the third substrate 3).

Furthermore, in a preparatory step of the manufacturing method according to this variation of the glass panel unit 8, the third glass panel 35 is prepared in addition to the first glass panel 15 and the second glass panel 25. The third glass panel 35 is a glass pane cut out from mother glass into a predetermined shape and further curved.

In the preparatory step, the first glass panel 15, the second glass panel 25, and the third glass panel 35 are preferably laid one on top of another and heated in this state to make all of the first glass panel 15, the second glass panel 25, and the third glass panel 35 curved together. As an example, the second glass panel 25 is laid on top of the part corresponding with the principal part 1a of the first glass panel 15, and the third glass panel 35 is laid on top of the second glass panel 25, and the first, second, and third glass panels 15, 25, 35 are heated in this state to make all of the first, second, and third glass panels 15, 25, 35 curved together. In this variation, this step is also unnecessary if the glass panel unit 8 does not have to be curved.

In the variation described above, the second space S2 is formed between the second substrate 2 and the third substrate 3 (or between the first substrate 1 and the third substrate 3). Alternatively, the second substrate 2 and the third substrate 3 (or the first substrate 1 and the third substrate 3) may be bonded with a film, instead of having the second space S2 formed. The film is a film molded from, for example, an EVA resin or a PVB resin.

Optionally, in addition to the third substrate 3, a fourth substrate including a fourth glass panel may be prepared, the third substrate 3 and the second substrate 2 may be bonded with a first film, and the fourth substrate and the first substrate 1 may be bonded with a second film. This would achieve the advantages of reducing scattering of fragments at the time of breakage and improving sound insulation by having substrate(s) externally bonded with one or both of the first substrate 1 and the second substrate 2 with a film interposed between at least one pair of the substrates.

Aspects

As can be seen from the foregoing description of the exemplary embodiment and its variations, a glass panel unit (8) according to a first aspect has the following configuration. Specifically, the glass panel unit (8) according to the first aspect includes: a first substrate (1) including a first glass panel (15); a second substrate (2) including a second glass panel (25) and arranged to face the first substrate (1); and a frame-shaped sealing portion (4). The sealing portion (4) is hermetically bonded to the first substrate (1) and the second substrate (2) so as to create an evacuated space (S1) between the first substrate (1) and the second substrate (2). When viewed from a region where the second substrate (2) is positioned with respect to the first substrate (1), the first substrate (1) includes a part (1b) arranged to stick out of an edge (2a) of the second substrate (2). The part (1b) includes a mounting portion (5) used to mount the glass panel unit (8) onto a vehicle (9).

In the glass panel unit (8) according to the first aspect, a hermetically sealed space (S1) at an evacuated state is formed between the first substrate (1) and the second substrate (2). Therefore, the glass panel unit (8) may have excellent thermal insulation properties. In addition, a mounting portion (5) is formed on an end part (1b) of the first substrate (1), and therefore, by using this mounting portion (5), the glass panel unit (8) may be mounted onto the vehicle (9) easily and with high reliability.

A glass panel unit (8) according to a second aspect may be implemented in combination with the first aspect. In the glass panel unit (8) according to the second aspect, the mounting portion (5) is at least one mounting hole (52) penetrating through the part (1b).

In the glass panel unit (8) according to the second aspect, the glass panel unit (8) may be mounted onto the vehicle (9) easily and with high reliability by having a mounting member such as a bolt inserted into at least one mounting hole (52).

A glass panel unit (8) according to a third aspect may be implemented in combination with the first or second aspect. In the glass panel unit (8) according to the third aspect, the thickness (t1) of the first glass panel (15) is greater than the thickness (t2) of the second glass panel (25).

In the glass panel unit (8) according to the third aspect, the mounting portion (5) is provided for the first substrate (1) including a relatively thick first glass panel (15). This facilitates ensuring sufficient strength for the mounting portion (5), and therefore, allows mounting the glass panel unit (8) onto the vehicle (9) with even higher reliability.

A glass panel unit (8) according to a fourth aspect may be implemented in combination with any one of the first to third aspects. In the glass panel unit (8) according to the fourth aspect, the first glass panel (15) and the second glass panel (25) are made of chemically tempered glass.

The glass panel unit (8) according to the fourth aspect may be provided as a glass panel unit (8), of which the strength is increased so much as to mount the glass panel unit (8) onto the vehicle (9) with even higher reliability.

A glass panel unit (8) according to a fifth aspect may be implemented in combination with any one of the first to fourth aspects. In the glass panel unit (8) according to the fifth aspect, the first substrate (1) and the second substrate (2) curve alongside of each other.

In the glass panel unit (8) according to the fifth aspect, the glass panel unit (8) to be mounted on the vehicle (9) may be provided as, for example, a glass panel unit, of which the curve is in conformity with the curve of the body of the vehicle (9). Each of the first substrate (1) and the second substrate (2) only needs to be at least partially curved.

A glass panel unit (8) according to a sixth aspect may be implemented in combination with any one of the first to fifth aspects. The glass panel unit (8) according to the sixth aspect further includes a third substrate (3). The third substrate (3) includes a third glass panel (35) and is bonded to one substrate selected from the first substrate (1) and the second substrate (2).

The glass panel unit (8) according to the sixth aspect may be provided as a glass panel unit (8), of which the thermal insulation properties are improved so much as to mount the glass panel unit (8) onto the vehicle (9) with even higher reliability.

A glass panel unit (8) according to a seventh aspect may be implemented in combination with the sixth aspect. The glass panel unit (8) according to the seventh aspect further includes a frame-shaped second sealing portion (47). The second sealing portion (47) is hermetically bonded to the one substrate and the third substrate (3) to provide a hermetically sealed space (S2) between the one substrate and the third substrate (3).

The glass panel unit (8) according to the seventh aspect may be provided as a glass panel unit (8), of which the thermal insulation properties are improved so much as to mount the glass panel unit (8) onto the vehicle (9) with increased reliability.

A glass panel unit (8) according to an eighth aspect may be implemented in combination with the sixth or seventh aspect. In the glass panel unit (8) according to the eighth aspect, the first substrate (1), the second substrate (2), and the third substrate (3) curve alongside of each other.

In the glass panel unit (8) according to the eighth aspect, the glass panel unit (8) to be mounted on the vehicle (9) may be provided as, for example, a glass panel unit, of which the curve is in conformity with the curve of the body of the vehicle (9). Each of the first substrate (1), the second substrate (2), and the third substrate (3) only needs to be at least partially curved.

A glass panel unit (8) according to a ninth aspect may be implemented in combination with any one of the first to eighth aspects. In the glass panel unit (8) according to the ninth aspect, the vehicle (9) is an automobile.

The glass panel unit (8) according to the ninth aspect may be mounted onto an automobile easily and with high reliability by using the mounting portion (5).

A glass panel unit (8) according to a tenth aspect may be implemented in combination with the ninth aspect. In the glass panel unit (8) according to the tenth aspect, the mounting portion (5) is a part used for fitting the glass panel unit (8) into a side window of the automobile.

The glass panel unit (8) according to the tenth aspect may be mounted onto a side window of the automobile easily and with high reliability by using the mounting portion (5).

A manufacturing method of the glass panel unit (8) according to the third aspect preferably includes the step of evacuating the space (S1) through an exhaust port (17) provided through the first glass panel (15).

According to this manufacturing method, the exhaust port (17) is provided through the relatively thick first glass panel (15). This facilitates ensuring sufficient strength for the glass panel unit (8).

A manufacturing method of the glass panel unit (8) according to the fifth aspect preferably includes the step of having both of the first glass panel (15) and the second glass panel (25) curved together in a state where the first and the second glass panels (15, 25) are laid one on top of the other.

According to this manufacturing method, the glass panel unit (8) including the first substrate (1) and the second substrate (2) which curve alongside of each other may be efficiently manufactured.

A manufacturing method of the glass panel unit (8) according to the eighth aspect preferably includes the step of having all of the first glass panel (15), the second glass panel (25), and the third glass panel (35) curved together in a state where the first, second, and third glass panels (15, 25, 35) are laid one on top of another.

According to this manufacturing method, the glass panel unit (8). including the first substrate (1), the second substrate (2), and the third substrate (3) which curve alongside of each other, may be efficiently manufactured.

Although an embodiment of a glass panel unit and a method for manufacturing the same according to the present disclosure has been described, the embodiment is only an exemplary one of various embodiments of the present disclosure and should not be construed as limiting. Rather, the exemplary embodiment of the glass panel unit and manufacturing method thereof may be readily modified in various manners depending on a design choice or any other factor as long as the same advantages as the ones falling within the scope of the present disclosure are achieved.

REFERENCE SIGNS LIST

1 First Substrate
1b Part
15 First Glass Panel
2 Second Substrate
2a Edge
25 Second Glass Panel
3 Third Substrate
35 Third Glass Panel
4 Sealing Portion
47 Second Sealing Portion
5 Mounting Portion
52 Mounting Hole
8 Glass Panel Unit
9 Vehicle
t1 Thickness
t2 Thickness
S1 Space
S2 Space

The invention claimed is:

1. A glass panel unit comprising:
a first substrate including a first glass panel;
a second substrate including a second glass panel and arranged to face the first substrate; and
a frame-shaped sealing portion that is hermetically bonded to the first substrate and the second substrate so as to create an evacuated space between the first substrate and the second substrate,
the first substrate having a part arranged to stick out of an edge of the second substrate when viewed from a region where the second substrate is positioned with respect to the first substrate,
the part including a mounting portion used to mount the glass panel unit onto a vehicle,
the mounting portion comprising at least one mounting hole penetrating through the part,
the first substrate and the second substrate curving alongside of each other,
the part being a flat part.

2. The glass panel unit of claim 1, wherein
thickness of the first glass panel is greater than thickness of the second glass panel.

3. The glass panel unit of claim 1, wherein
the first glass panel and the second glass panel are made of chemically tempered glass.

4. The glass panel unit of claim 1, further comprising
a third substrate including a third glass panel and bonded to one substrate selected from the first substrate and the second substrate.

5. The glass panel unit of claim 4, further comprising
a frame-shaped second sealing portion that is hermetically bonded to the one substrate and the third substrate to provide a hermetically sealed space between the one substrate and the third substrate.

6. The glass panel unit of claim 4, wherein
the first substrate, the second substrate, and the third substrate curve alongside of each other.

7. The glass panel unit of claim 1, wherein
the vehicle is an automobile.

8. The glass panel unit of claim 7, wherein
the mounting portion is a part used for fitting the glass panel into a side window of the automobile.

9. A method for manufacturing the glass panel unit of claim 3, the method comprising
evacuating the space through an exhaust port provided through the first glass panel.

10. A method for manufacturing the glass panel unit of claim 6, the method comprising
having all of the first glass panel, the second glass panel, and the third glass panel curved together in a state where the first, second, and third glass panels are laid one on top of another.

* * * * *